(12) United States Patent
Gueta et al.

(10) Patent No.: US 12,169,449 B1
(45) Date of Patent: Dec. 17, 2024

(54) SYSTEM, METHOD, AND COMPUTER PROGRAM FOR TEST-RELATED AUTOMATIC TRACING

(71) Applicant: Amdocs Development Limited, Limassol (CY)

(72) Inventors: Limor Gueta, Mabuim (IL); Itsik David, Petach Tiqwa (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 142 days.

(21) Appl. No.: 18/107,360

(22) Filed: Feb. 8, 2023

(51) Int. Cl.
  *G06F 11/36* (2006.01)
  *G06F 8/70* (2018.01)
  *G06F 9/445* (2018.01)
  *G06F 9/455* (2018.01)
  *G06N 5/04* (2023.01)
  *G06N 20/00* (2019.01)

(52) U.S. Cl.
  CPC ...... *G06F 11/3684* (2013.01); *G06F 11/3676* (2013.01); *G06F 11/3692* (2013.01)

(58) Field of Classification Search
  CPC ............ G06F 11/3684; G06F 11/3676; G06F 11/3692; G06F 11/3672; G06F 8/70; G06N 20/00; G06N 3/006
  See application file for complete search history.

(56) References Cited

U.S. PATENT DOCUMENTS 10,452,521 B2 * 10/2019 Kaulgud ............. G06F 11/3684
11,900,325 B2 * 2/2024 Kulkarni .......... G06Q 10/06393

* cited by examiner

*Primary Examiner* — Thuy Dao
(74) *Attorney, Agent, or Firm* — Zilka-Kotab, P.C.

(57) ABSTRACT

As described herein, a system, method, and computer program are provided for test-related automatic tracing. A new requirement defined for an application is identified. The new requirement is processed, using a machine learning model, to predict each portion of the new requirement covered by existing test features. One or more new test features are caused to be created for the new requirement, based on the prediction of each portion of the new requirement covered by existing test features.

20 Claims, 5 Drawing Sheets

SYSTEM, METHOD, AND COMPUTER PROGRAM FOR TEST-RELATED AUTOMATIC TRACING

FIELD OF THE INVENTION

The present invention relates to code testing in computer systems.

BACKGROUND

Testing computer code is an important task for code development and deployment, and many solutions currently exist for creating and executing tests for computer code including software applications. Conventionally, whenever a new requirement is defined for an application, a new test must be created for use in testing that the application has been correctly customized to satisfy the new requirement. However, current techniques involve connecting new requirements to their respective test sets manually, in some cases using an application lifecycle tool for traceability. There is therefore no real validation process for the connection. Furthermore, when a defect is detected from a test executed on the application, the defect is only connected to that test instance corresponding to a particular requirement, even though the defect may also affect additional requirements.

There is thus a need for addressing these and/or other issues associated with the prior art.

SUMMARY

As described herein, a system, method, and computer program are provided for test-related automatic tracing. A new requirement defined for an application is identified. The new requirement is processed, using a machine learning model, to predict each portion of the new requirement covered by existing test features. One or more new test features are caused to be created for the new requirement, based on the prediction of each portion of the new requirement covered by existing test features.

DETAILED DESCRIPTION

Figure 1:
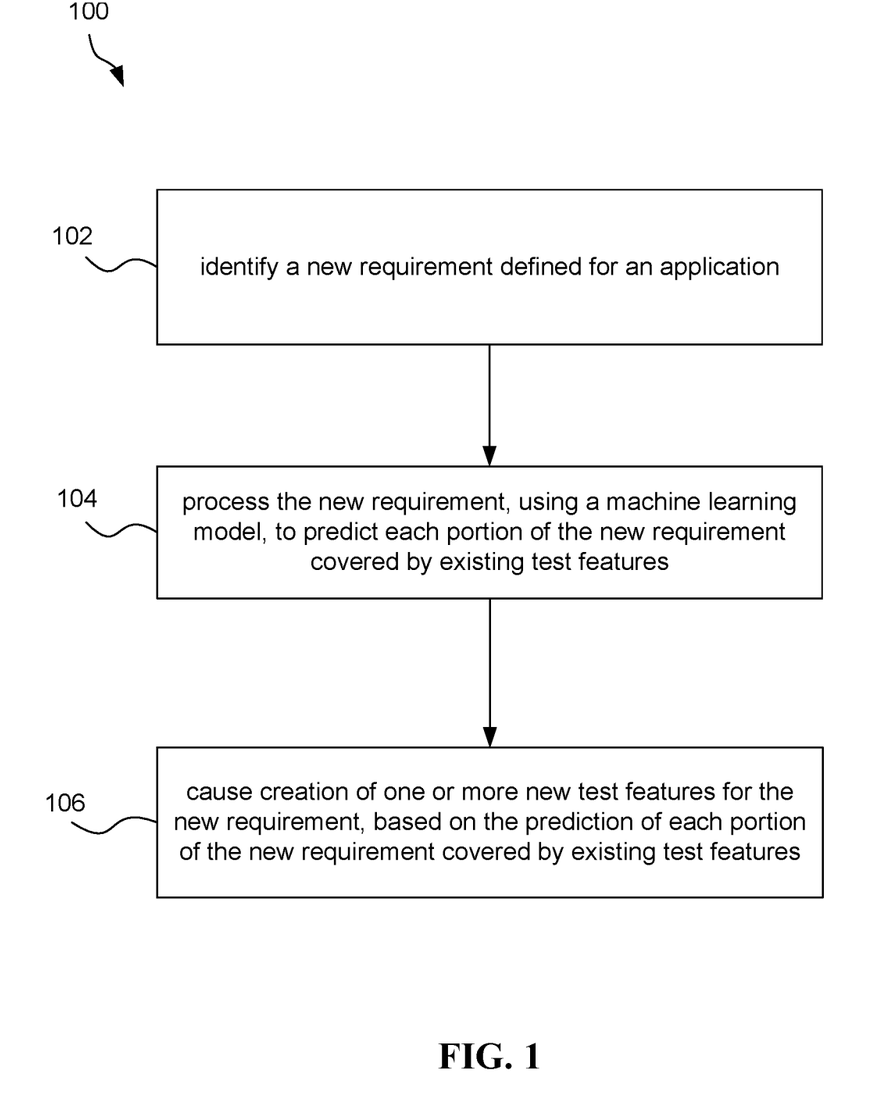
FIG. 1 illustrates a method for predicting existing test coverage for a new application requirement, in accordance with one embodiment.

FIG. 1 illustrates a method 100 for predicting existing test coverage for a new application requirement, in accordance with one embodiment. The method 100 may be performed by any computer system described below with respect to FIGS. 4 and/or 5.

In operation 102, a new requirement defined for an application is identified. The application may be an end-user application (e.g. having user interfaces), in an embodiment. In another embodiment, the application may be a back-end application.

The new requirement refers to any requirement for testing the application. In an embodiment, the new requirement indicates a change to the application. For example, each change made to an application may require testing to ensure that the application executes as intended. In an embodiment, the new requirement may be identified upon the new requirement being defined for the application.

In operation 104, the new requirement is processed, using a machine learning model, to predict each portion of the new requirement covered by existing test features. The machine learning model refers to any model trained to predict test coverage for newly defined application requirements (i.e. by existing test features). In an embodiment, the machine learning model may be trained to predict such test coverage using training data that includes historical execution requirements, historical test cases, historical automation flows, and historical defects. In an embodiment, the machine learning model may use natural language processing to recognize tokens in the new requirement and to use the tokens to predict each portion of the new requirement covered by existing test features.

The existing test features refer to any test features that have already been defined (e.g. for use in testing the application). For example, the test features may have been previously created for testing the application. In an embodiment, the test features may be stored in a test repository. The test features may have been manually defined or automatically defined. In an embodiment, the existing test features may include existing test cases. In another embodiment, the existing test features may include existing automation flows (e.g. regression flows, progression flows, etc.).

In operation 106, one or more new test features are caused to be created for the new requirement, based on the prediction of each portion of the new requirement covered by existing test features. The new test features may be new test cases, in an embodiment. The new test features may be new automation flows, in another embodiment.

In an embodiment, causing creation of one or more new test features for the new requirement, based on the prediction, may include causing creation of one or more new test features for each remaining portion of the new requirement not covered by the existing test features. Thus, the new test features may be created to result in 100% test coverage for the new requirement. In an embodiment, causing creation of one or more new test features may include outputting, to a user interface, an indication of each remaining portion of the new requirement not covered by the existing test features, to cause a user to create the one or more new test features. In another embodiment, causing creation of one or more new test features may include outputting, to a system, an indication of each remaining portion of the new requirement not covered by the existing test features, to cause the system to automatically create the one or more new test features.

To this end, the method 100 may be performed to determine any missing test coverage for a new requirement defined for an application, so that new test features can be created as needed to provide 100% test coverage. In an embodiment, this method 100 may provide 100% automatic traceability from test features to the new requirement.

In one exemplary implementation, the method 100 may include adding the newly created test features to the training data to retrain the machine learning model. In another exemplary implementation, the method 100 may include using the existing test features and the one or more new test features to test the application. In an embodiment where a defect is detected as a result of the testing, the method 100 may include performing one or more actions, based on defined policies, for addressing the defect. One embodiment of addressing the defect is described below with respect to the method 200 of FIG. 2.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
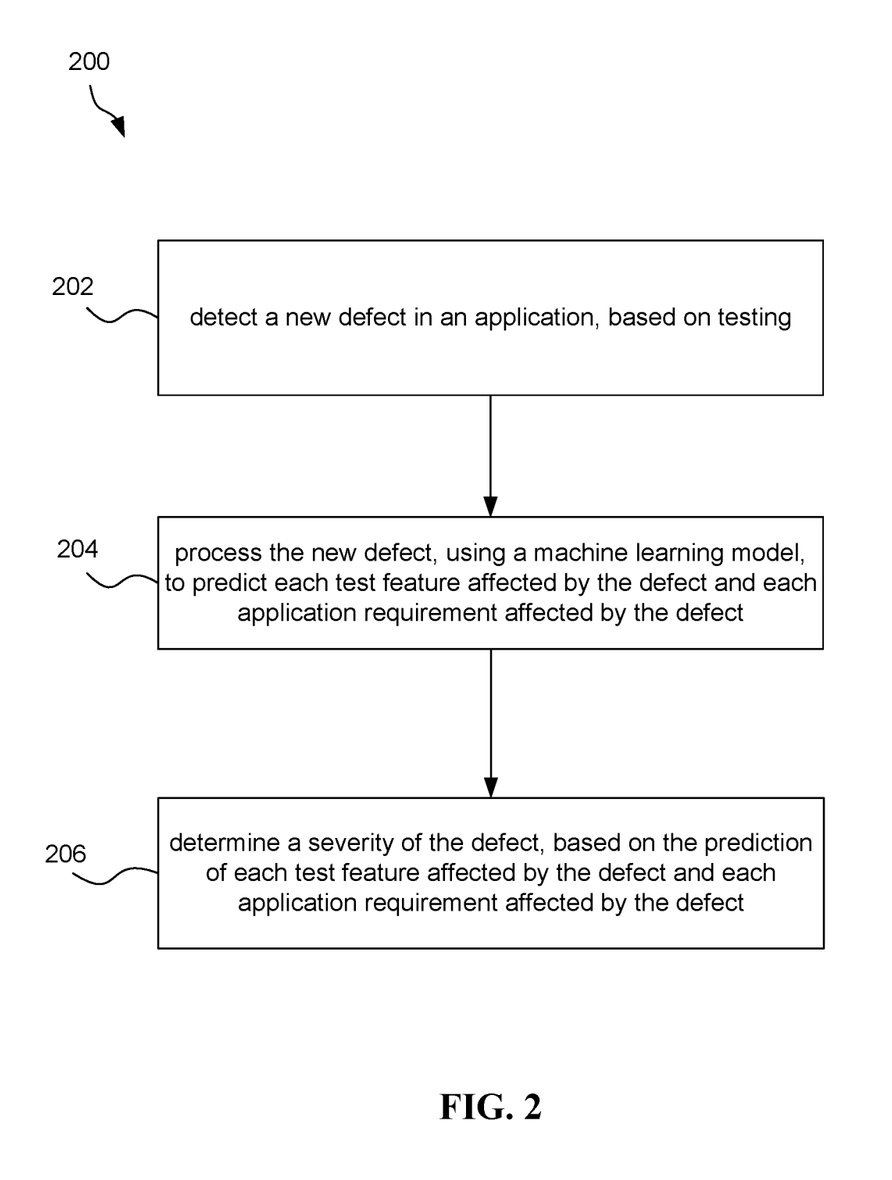
FIG. 2 illustrates a method for determining a severity of a defect, based on a prediction of each test feature affected by the defect and each application requirement affected by the defect, in accordance with one embodiment.

FIG. 2 illustrates a method 200 for determining a severity of a defect, based on a prediction of each test feature affected by the defect and each application requirement affected by the defect, in accordance with one embodiment. As an option, the method 200 may be carried out in the context of the details of the previous figure and/or any subsequent figure(s). For example, the method 200 may be included as an extension to the method 100 of FIG. 1. Of course, however, the method 200 may be carried out in the context of any desired environment. Further, the aforementioned definitions may equally apply to the description below.

In operation 202, a new defect is detected in an application, based on testing. The testing may use any existing test cases and existing automation flows to test the application. In the present embodiment, the testing may use the test cases and automation flows described above with reference to the method 100 of FIG. 1. The defect refers to any unintended characteristic of the application, such as an error occurring within the execution of the application, a failure of the application, etc.

In operation 204, the new defect is processed, using a machine learning model, to predict each test feature affected by the defect and each application requirement affected by the defect. The machine learning model may also predict a responsible application that is a source of the defect.

The machine learning model refers to any model trained using machine learning to predict affected test features and affected applications requirements for newly detected defects. In an embodiment, the machine learning model may be trained using the same training data used to train the machine learning model used in the method 100 of FIG. 1. For example, the machine learning model may be trained using training data that includes historical execution requirements, historical test cases, historical automation flows, and historical defects.

In operation 206, a severity of the defect is determined based on the prediction of each test feature affected by the defect and each application requirement affected by the defect. The test features affected by the defect may refer to test features that cover a portion of the application in which the defect was detected (e.g. test features that also would detect the defect). The application requirements affected by the defect may refer to requirements defined for other portions of the application that may be affected by the defect.

In an embodiment, the severity of the defect may be determined by calculating a percentage of all test features affected by the defect and all application requirements affected by the defect. Of course, any defined threshold or policy may be used to determine the severity of the defect as a function of the test features and application requirements affected by the defect.

To this end, the method 200 may be performed for determining a severity of a defect, which in turn may be used as a basis for addressing the defect. Addressing the defect may include analyzing the defect and correcting a portion of the application causing the defect. In an embodiment, the addressing of the defect may be prioritized, based on the severity of the defect. For example, a defect affecting more test features and/or more application requirements than another defect may be prioritized (i.e. for taking corrective action) over that other defect. To this end, in an embodiment, this method 200 may provide 100% automatic traceability from defects to requirement and affected regression flows.

Figure 3:
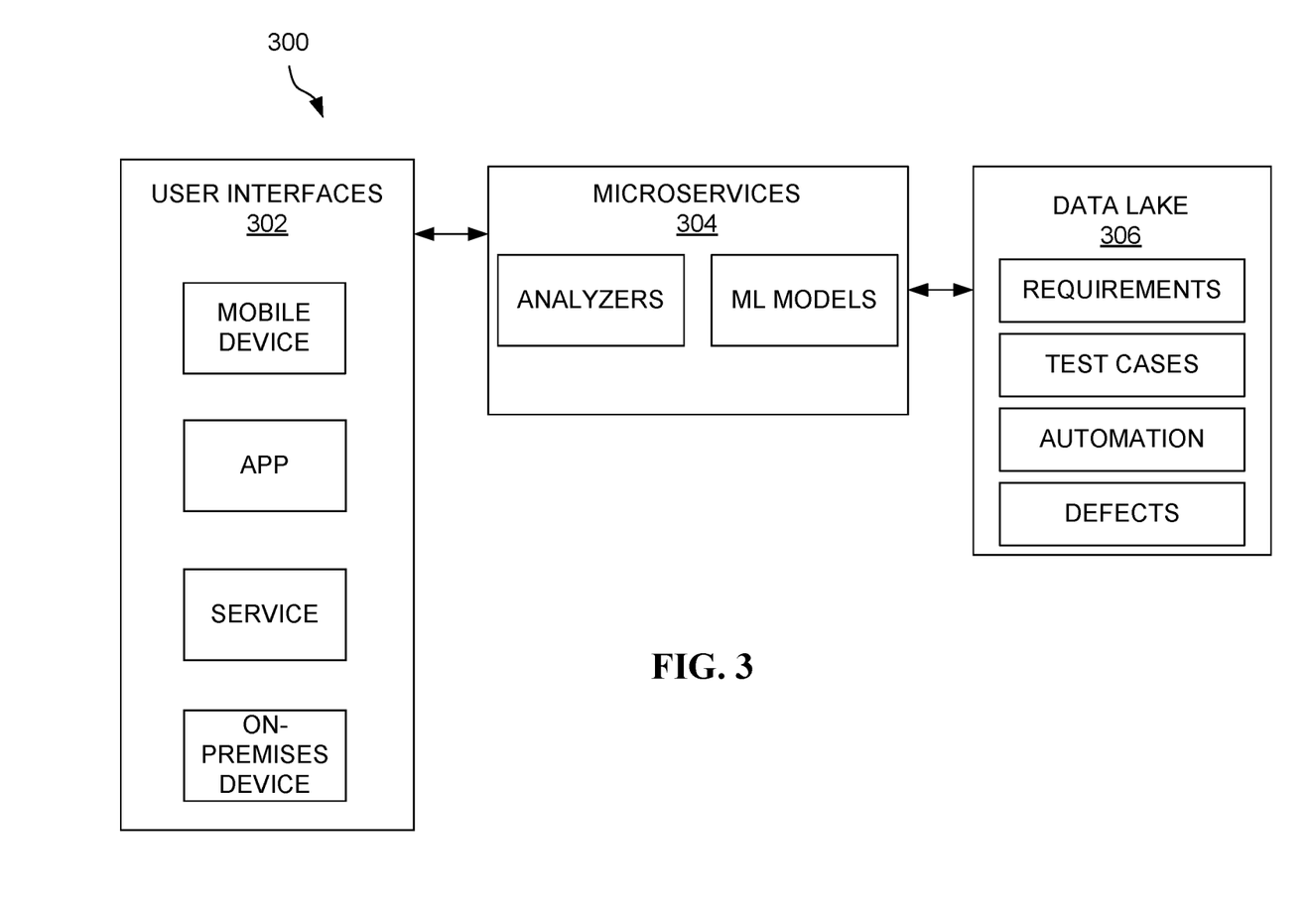
FIG. 3 illustrates a system for test-related automatic tracing, in accordance with one embodiment.

FIG. 3 illustrates a system 300 for test-related automatic tracing, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

The present system 300 is configured to address two use cases for testing applications:
  Use case 1: Identify how defect is affecting the full testing scope (requirements, regression and/or progression) in order to really determine its severity and priority.
  Use case 2: Quickly and automatically map existing test cases to a new requirement and by that save time of duplicate creation and execution for test cases.

One or more user interfaces 302 are configured to receive input and provide output to one or more users. In various embodiments, the user interfaces 302 include those of mobile devices, apps, services, and/or on-premises equipment. The input may be changes to an application prompting the definition of new requirements, in an embodiment. The output may be an indication of portions of a new requirement not covered by existing test features and/or an indication of severity and/or priority of a newly detected defect.

Microservices 304 (e.g. executing in the cloud) are configured with machine learning models as follows:
  Machine learning model 1: Trained with training data that will include historical requirements, historical features, historical epics, historical test cases, historical automations (of progression and regression with all properties). This machine learning model will analyze which test coverage is missing for a new requirement.
  Machine learning model 2: Trained with training data that will the same data used to train Machine learning model 1, as well as historical defect information. This machine learning model will analyze the similarity of a defect to historical defects and will recommend a severity and priority for the defect according to a threshold.

The microservices 304 include image, log, and defect analyzers that tokenize the training data, any new requirement to be processed by machine learning model 1, and any defect to be processed by machine learning model 2.

A data lake 306 operates to store requirements, test cases, automations, and defects. As noted above, this information in the data lake 306 may be used to train the machine learning models. Updates to the information in the data lake 306 may be used to retrain the machine learning models.

Figure 4:
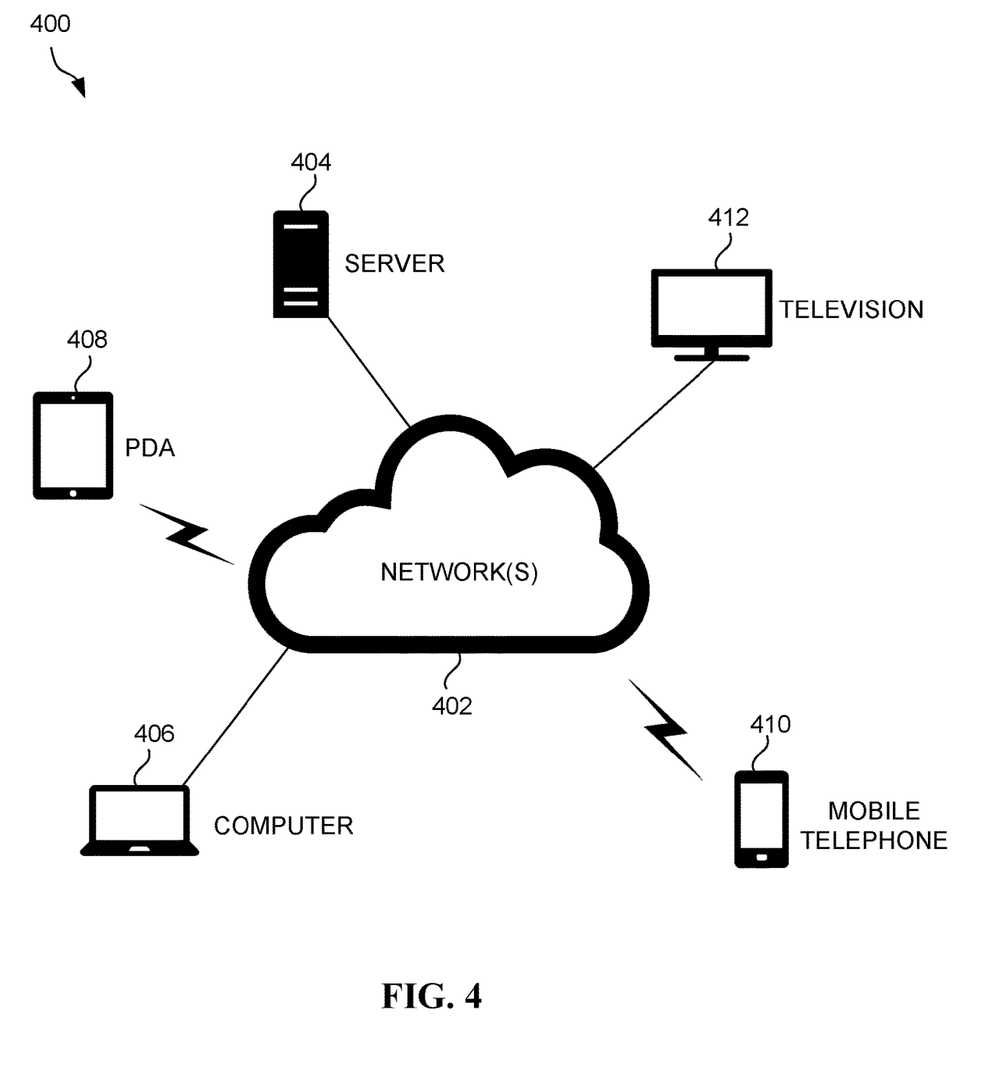
FIG. 4 illustrates a network architecture, in accordance with one possible embodiment.
Figure 5:
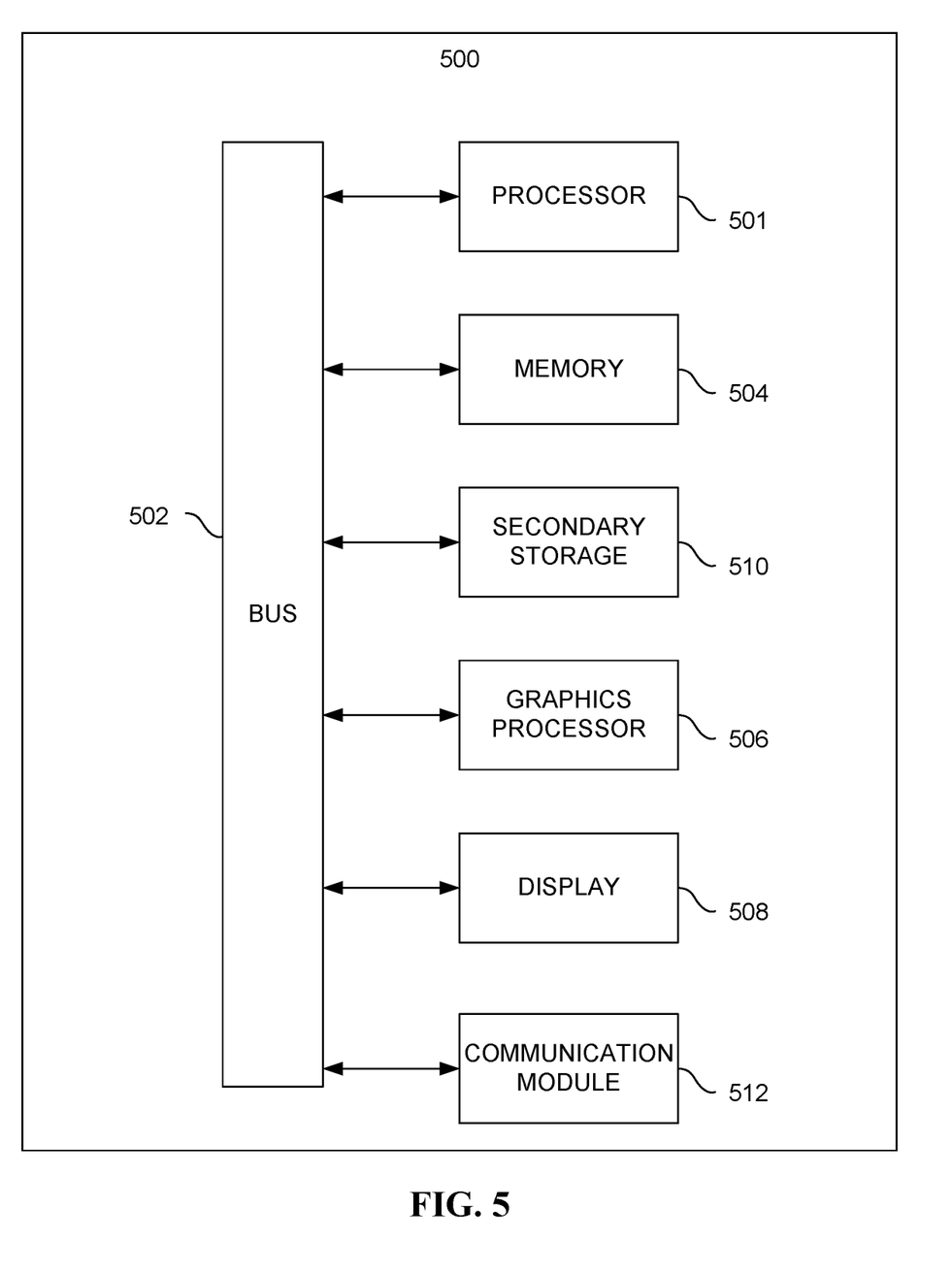
FIG. 5 illustrates an exemplary system, in accordance with one embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
    identify a new requirement defined for an application;
    process the new requirement, using a machine learning model, to predict each portion of the new requirement covered by existing test features; and
    cause creation of one or more new test features for the new requirement, based on the prediction of each portion of the new requirement covered by existing test features.

2. The non-transitory computer-readable media of claim 1, wherein the new requirement indicates a change to the application.

3. The non-transitory computer-readable media of claim 1, wherein the machine learning model uses natural language processing to recognize tokens in the new requirement and to use the tokens to predict each portion of the new requirement covered by existing test features.

4. The non-transitory computer-readable media of claim 1, wherein the existing test features include existing test cases.

5. The non-transitory computer-readable media of claim 1, wherein the existing test features include existing automation flows.

6. The non-transitory computer-readable media of claim 5, wherein the existing automation flows include regression flows.

7. The non-transitory computer-readable media of claim 1, wherein the existing test features include test features previously created for testing the application.

8. The non-transitory computer-readable media of claim 1, wherein the device is further caused to:
    train the machine learning model to predict test coverage for newly defined application requirements, using training data that includes:
    historical execution requirements,
    historical test cases,
    historical automation flows, and
    historical defects.

9. The non-transitory computer-readable media of claim 1, wherein causing creation of one or more new test features for the new requirement, based on the prediction, includes:
    causing creation of one or more new test features for each remaining portion of the new requirement not covered by the existing test features.

10. The non-transitory computer-readable media of claim 9, wherein causing creation of one or more new test features includes outputting, to a user interface, an indication of each remaining portion of the new requirement not covered by the existing test features, to cause a user to create the one or more new test features.

11. The non-transitory computer-readable media of claim 9, wherein causing creation of one or more new test features includes outputting, to a system, an indication of each remaining portion of the new requirement not covered by the existing test features, to cause the system to automatically create the one or more new test features.

12. The non-transitory computer-readable media of claim 1, wherein the device is further caused to:
    use the existing test features one or more new test features to test the application.

13. The non-transitory computer-readable media of claim 12, wherein the device is further caused to:
    detect a new defect in the application, based on the testing.

14. The non-transitory computer-readable media of claim 13, wherein the device is further caused to:
    process the new defect, using a second machine learning model, to predict each test feature affected by the defect and each application requirement affected by the defect.

15. The non-transitory computer-readable media of claim 14, wherein the second machine learning model additionally predicts a responsible application that is a source of the defect.

16. The non-transitory computer-readable media of claim 15, wherein the device is further caused to:
    prioritize addressing the defect, based on the severity.

17. The non-transitory computer-readable media of claim 14, wherein the device is further caused to:
    train the second machine learning model to predict affected test features and affected applications requirements for newly detected defects, using training data that includes:
    historical execution requirements,
    historical test cases,
    historical automation flows, and
    historical defects.

18. The non-transitory computer-readable media of claim 14, wherein the device is further caused to:
    determine a severity of the defect, based on the prediction of each test feature affected by the defect and each application requirement affected by the defect.

19. A method, comprising:

at a computer system:

identifying a new requirement defined for an application;

processing the new requirement, using a machine learning model, to predict each portion of the new requirement covered by existing test features; and causing creation of one or more new test features for the new requirement, based on the prediction of each portion of the new requirement covered by existing test features.

20. A system, comprising:

a non-transitory memory storing instructions; and one or more processors in communication with the non-transitory memory that execute the instructions to:

identify a new requirement defined for an application;

process the new requirement, using a machine learning model, to predict each portion of the new requirement covered by existing test features; and cause creation of one or more new test features for the new requirement, based on the prediction of each portion of the new requirement covered by existing test features.

\* \* \* \* \*